United States Patent
Klein et al.

(10) Patent No.: US 6,526,371 B1
(45) Date of Patent: Feb. 25, 2003

(54) ROUND TRIP RESPONSE TIME MEASUREMENT FOR COMPUTER PROGRAMS

(75) Inventors: Paul F. Klein, Thousand Oaks, CA (US); Linh Ba Chung, Simi Valley, CA (US)

(73) Assignee: Candle Distributed Solutions, Inc., El Segundo, CA (US)

( * ) Notice: Subject to any disclaimer, the term of this patent is extended or adjusted under 35 U.S.C. 154(b) by 0 days.

(21) Appl. No.: 09/428,262

(22) Filed: Oct. 27, 1999

(51) Int. Cl.[7] ............................................. G06F 11/30
(52) U.S. Cl. .................. 702/186; 702/119; 702/176; 702/177; 702/178; 702/182; 702/194
(58) Field of Search .................. 702/176, 178, 702/186, 119, 179, 182, 187, 194; 707/10; 370/252, 229–237; 709/224, 223–226; 714/47, 51, 55

(56) References Cited

U.S. PATENT DOCUMENTS

| | | | |
|---|---|---|---|
| 5,483,468 A | | 1/1996 | Chen et al. ................. 702/186 |
| 5,483,658 A | * | 1/1996 | Grube et al. ............... 713/200 |
| 5,506,955 A | | 4/1996 | Chen et al. ................. 714/26 |
| 5,511,185 A | | 4/1996 | Weinbaum et al. ......... 714/38 |
| 5,519,438 A | | 5/1996 | Elliott et al. ............... 348/180 |
| 5,553,235 A | | 9/1996 | Chen et al. ................. 714/20 |
| 5,764,912 A | * | 6/1998 | Rosborough ............... 709/224 |
| 5,781,449 A | * | 7/1998 | Rosborough ............... 709/224 |
| 5,802,302 A | * | 9/1998 | Waclawsky et al. ....... 709/224 |
| 5,872,976 A | | 2/1999 | Yee et al. ................... 717/4 |
| 5,881,237 A | * | 3/1999 | Schwaller et al. ......... 709/224 |
| 5,946,302 A | * | 8/1999 | Waclawsky et al. ....... 370/252 |
| 5,991,705 A | * | 11/1999 | Klein et al. ................ 702/176 |
| 6,108,700 A | * | 8/2000 | Maccabee et al. ......... 709/224 |
| 6,144,961 A | * | 11/2000 | de la Salle ................. 707/10 |
| 6,202,036 B1 | * | 3/2001 | Klein et al. ................ 702/178 |
| 6,256,669 B1 | * | 7/2001 | Hurwitz ..................... 709/224 |
| 6,286,046 B1 | * | 9/2001 | Bryant ....................... 709/224 |
| 6,308,211 B1 | * | 10/2001 | Rosborough et al. ...... 709/224 |

* cited by examiner

*Primary Examiner*—Marc S. Hoff
*Assistant Examiner*—Carol S W Tsai
(74) *Attorney, Agent, or Firm*—Gates & Cooper LLP

(57) ABSTRACT

A method, apparatus, and article of manufacture for measuring a round trip response time for a transaction performed by a computer in a network environment. The method comprises the steps of starting a software timer when a transaction is initiated at a browser of the computer, and sending the transaction to a server in the network environment. The server services the transaction, and generates a response to the transaction. When the response is received at the browser the software timer is stopped. The start time is subtracted from the stop time to calculate a round trip response time.

24 Claims, 3 Drawing Sheets

ROUND TRIP RESPONSE TIME MEASUREMENT FOR COMPUTER PROGRAMS

CROSS-REFERENCE TO RELATED APPLICATIONS

This application is related to U.S. patent application Ser. No. 08/899,195, filed Jul. 23, 1997, entitled "END-TO-END RESPONSE TIME MEASUREMENT FOR COMPUTER PROGRAMS USING STARTING AND ENDING QUEUES," by Paul F. Klein et al., now U.S. Pat. No. 5,991,705, issued on Nov. 12, 1999, which application is incorporated by reference herein.

BACKGROUND OF THE INVENTION

1. Field of the Invention

This invention relates generally to computer hardware and software, and more particularly to a round trip response time measurement for computer programs.

2. Description of Related Art

In today's environment, it is common for desktop computers to run many different local and/or network applications simultaneously. Within such computing environments, it is not unusual for one application to execute significantly slower than other applications. Further, it is not uncommon for the operation of one application to seriously impact the performance of other applications on the computer. As a result, the user may have to wait an inordinate amount of time for applications to respond. The wait time experienced by a user is typically directly related to that user's productivity and business opportunity.

As more software applications and information are transferred via the Internet, determining performance of individual applications, based only on their observable behavior, becomes difficult. For example, a user may be unable to reliably detect whether abnormal performance for a specific application is the result of operations performed by that application, or whether it is the result of the impact from another application, or whether it is the result of the performance of the server or another remote system. Further, since each application may be able to perform many different kinds of processing, the user may have no idea that certain requests have significantly worse performance. Thus, there is a need in the art for techniques that allow the performance of various applications to be accurately and automatically measured. Further, there is a need in the art for determining where the response time of each application is being affected.

SUMMARY OF THE INVENTION

To overcome the limitations in the prior art described above, and to overcome other limitations that will become apparent upon reading and understanding the present specification, the present invention discloses a method, apparatus, and article of manufacture for measuring round trip response time for computer programs.

The method comprises the steps of starting a software timer when a transaction is initiated at a terminal of the computer, and sending the transaction to a server in the network environment. The server services the transaction, and generates a response to the transaction. When the response is received at the terminal the software timer is stopped. The start time is subtracted from the stop time to calculate a round trip response time.

Round Trip Response Time can be calculated for transactions between a Web Browser and Web Server or a Web Application when these components are used over the Internet or Intranet. Further, using a dynamic Web Page tagging technique and a Java Applet, this Round Trip Response Time can be further segmented into sub-functions that make up the total transaction time. These sub-functions are known as Load Time, Resolve Time, Application Response Time and Browse Time.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like numbers represent similar features throughout.

DETAILED DESCRIPTION OF THE PREFERRED EMBODIMENT

In the following description of the preferred embodiment, reference is made to the accompanying drawings, which form a part hereof, and in which is shown by way of illustration the specific embodiment in which the invention may be practiced. It is to be understood that other embodiments may be utilized and structural and functional changes may be made without departing from the scope of the present invention.

Overview

Round Trip Response Time can be calculated for transactions between a commercial Web Browser and commercial Web Server and even a Web Application when these components are used over the Internet or Intranet. Further, using a dynamic Web Page tagging technique and a Java Applet, this Round Trip Response Time can be further segmented into sub-functions that make up the total transaction time. These sub-functions are known as Load Time, Resolve Time, Application Response Time and Browse Time.

Hardware Environment

Figure 1:
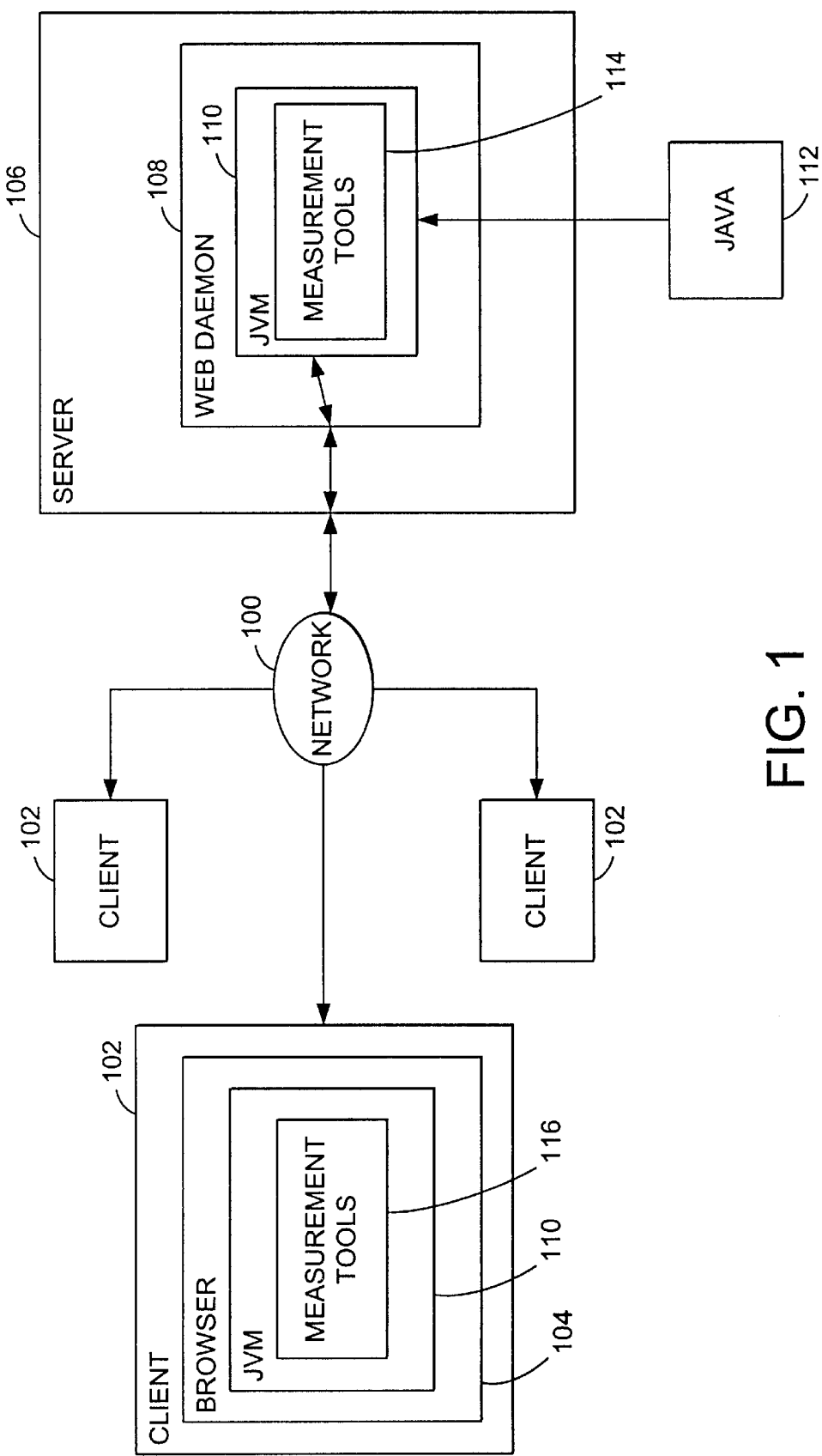
FIG. 1 illustrates an exemplary hardware environment that could be used to implement the preferred embodiment of the present invention.

FIG. 1 schematically illustrates an exemplary hardware environment that could be used with the preferred embodiment of the present invention, and more particularly, illustrates a typical distributed computer system using the Internet 100 to connect client systems 102 executing Web browsers 104 to server systems 106 executing Web daemons 108. A typical combination of resources may include clients 102 that are personal computers or workstations, and servers 106 that are personal computers, workstations, minicomputers, or mainframes. These systems are coupled to one another over a network 100, which may include networks such as LANs, WANs, SNA networks, as well as the Internet.

Either or both of the Web browser 104 and Web daemon 108 may include a Java Virtual Machine (JVM) 110 that executes Java objects, applets, scripts, etc., associated with various Web content. The server system 106 may further use the JVM 110 to create Java class specifications that are instantiated as Java objects 112 that comprise components of measurement tools 114. The client system may further use the JVM 110 to create Java class specifications that are instantiated as Java objects that comprise components of measurement tools 116.

In general, the measurement tools 114 and 116, and class specifications and objects 116 comprise data and/or logic which, when read and executed by a computer, cause the computer to perform the steps for performing and/or using the present invention. Generally, the data and/or logic are embodied in and/or readable from a device, carrier or media, such as memory, data storage devices, and/or remote devices coupled to the computer via data communications devices.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Software Components

A method is provided that can measure the "Round Trip Response Time" of a transaction, as it travels over several defined transaction segments that exists between an Internet or Intranet connected Web Browser and Web Server. A segment, as defined here, is that part of the overall transaction that can be described as a discrete sub-function of that transaction. For example, loading a web page from a Web Server, over the Internet, is just one of the several sub-functions that make up a transaction.

The present invention also describes methods for measuring these transaction segments (sub-functions) for better response time granularity beyond that of a single reported time, e.g., the Round Trip Response Time. A method in accordance with the present invention initially measures the initial segment of a transaction's response time, which begins at the Web Server 106. Then the measurement technology follows the transaction down from the Web Server 106 to the Web Browser 104 over the Internet 100, and finishes up measuring the rest of the transaction segments (sub-functions) response time at the Web Browser 110.

Further, a method in accordance with the present invention uses measurement tools 114, also called software agents 114, within the Web Server 106 that measures just the Web Server's 106 segment of a transaction's response time, called the Application Response Time, which is independent of the method for determining the Round Trip Response Time. When the Web Server 106 is using Common Gateway Interface (CGI) programs, or other similar back-end application enablers, the Application Response Time is the equivalent to the time spent in these back-end application enablers.

A specific method of implementation is provided and detailed on how the above technologies might be applied to transactions that flow from Web Browsers 104 to Web Servers 106 in an Internet 100 or network 100 environment. The method of the present invention uses the widely available Java language, JavaScript and Java Virtual Machine 110 as the measurement enabling technology. With these Java facilities, measurements of transaction segments, or sub-functions, called Load Time, Resolve Time, and Browse Time can be accomplished with the present invention.

By enabling finer granularity into the measurement tools 114 and 116, the present invention allows system designers and users to expedite Internet 100 transfer of data. By reviewing the Round Trip Response Time, and the sub-functions of the Round Trip Response Time, system users can perform tasks to speed up delivery of data. For example, if the segment of the response time indicates that the client 102 is overloaded with applications, the user can shut down non-essential applications to expedite delivery of data over the Internet 100. Further, if the segment of the response time indicates that the server 106 is overloaded, non-essential programs running on the server can be shut down to expedite data delivery.

Description Of Measurement Strategy

Figure 2:
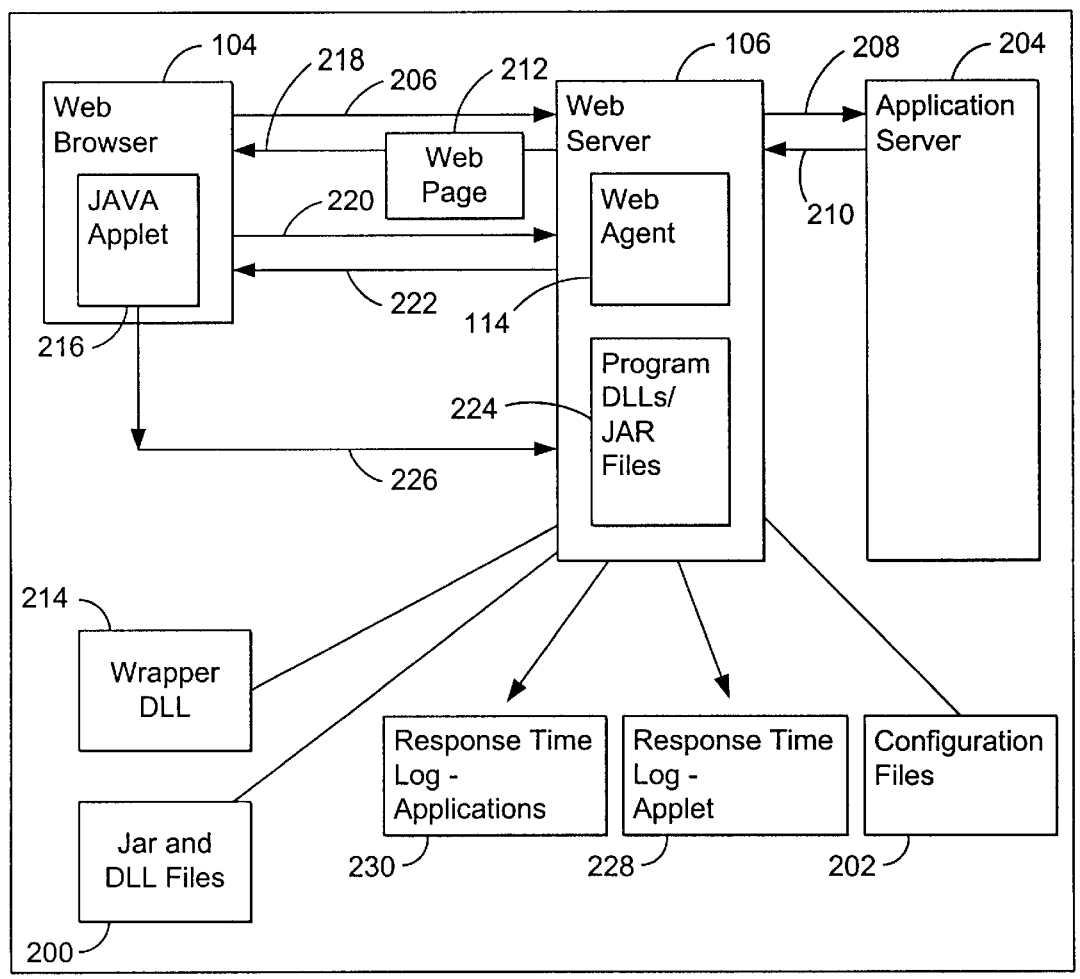
FIG. 2 illustrates the transaction sequences used in practicing the present invention.

FIG. 2 illustrates the transaction sequences used in practicing the present invention.

The response time measurement technology of the present invention is enabled by placing software agent code, Web Agent 114, into shareable directories of a commercial Web Server 106, e.g., Netscape's Web Server, Microsoft's IIS Server or Apache's Web Server 106. The Web Agent 114 is activated on the Web Server 106 due to the placement of several program DLLs 200 into this shareable directory, accessible by permission, by the Web Server 106 during its execution. In addition, depending on which Web Server 106 is being used, the Web Server's 106 configuration file 202 must be modified with parameters that indicate that the DLLs 200 should be loaded and used as part of the normal Web Server 106 operation.

Once DLLs 200 have been loaded and are part of the Web Server 106 operation, the response time measurement process is enabled as soon as commercial Web Server 106 becomes initialized. Starting with an interaction at the Web Browser 104 such as a Mouse-Click, <ENTER> key depression, or other selected keyboard operation, a transaction is generated that will request information from Web Server 106 and possibly that of the Application Server 204 as well. That transaction is sent to the Web Server 106 via a network path defined by path 206, which can be the Internet/Intranet 100, or any other public or private network.

Once this transaction arrives at Web Server 106, a decision is made by the Web Server 106 to either route this transaction to the Application Server 204 for additional service, or to service this transaction locally at the Web Server 106. If the transaction is to be routed to the Application Server 204, Web Agent 114 sets a software stopwatch prior to routing the transaction over network path 208 and labels this stopwatch as the start time of the Application Server's 204 "Application Response Time" measurement. Some time later as Application Server 204 processes this transaction, its results will be returned back to the Web Server 106 via network path 210. Web Agent 114 terminates the software stopwatch and takes the difference as being the complete "Application Response Time" Measurement. If Web Server 106 does not route this transaction to the Application Server 204, the transaction is serviced locally and no "Application Response Time" is calculated. Except for not calculating "Application Response Time", all other Web Agent 114 processing remains the same regardless of where the transaction was serviced.

The Application Response Time measures the amount of time that a Web transaction spends in the Back-End Application Server 204. In most cases this application resides on a different computer platform and is physically distant from the Web Server 106. For transactions that run locally at the Web Server 106, doing application server type work, the measurement reflects the length of time the transaction spent in the local Web Server 106.

Back-End Application Program Enabling Mechanisms

Web Servers 106 have the capability to call Back-End Application Programs running on Application Servers 204, as well as calling up and servicing Web Pages 212 from a local Web Page Library. Some commercial Web Servers 106 do not provide APIs that allow a standard mechanism to assist in performing response time measurements of back-end programs. The most common back-end program enabler, which frequently causes system errors or other problems for some Web Servers 106, is called CGI (Common Gateway Interface). However, CGI is not always available for a given Web Server 106, nor is CGI desirable for all Web Servers 106. As such, the present invention provides an alternative to CGI to perform response time measurements.

Wrapping the Back-End Application Processor

The present invention provides an additional DLL 214 being provided that fully wraps the commercial Back-End Application Processor packaged with the commercial Web Server 106. In addition, the Web Server 106 configuration is modified to point to the new DLL 214 as the new Back-End Application Processor to use when measurements are desired. By replacing the original processor DLL with the DLL 214 of the present invention, the new DLL 214 creates software stopwatches when entered, routes the transaction to the original commercial Application Processor, receives control back from the original commercial Application Processor then terminates the stopwatch. The difference between the start time and the stop time of the stopwatch is the "Application Response Time" measurement for the Web Server 106.

Replacing the Back-End Application Processor

In some cases, the Wrapper technique using DLL 214 cannot be used. These scenarios occur when the mechanism being used to call the back-end programs is not symmetrical, e.g., where the point at which control of the processor is called from is not the same point that control is returned to the processor. This sometimes occurs when a Web Server 106 is using the CGI processor.

The technique provided by the present invention replaces the original Back-End Application Processor DLL provided with the commercial Web Server 106 with a new DLL 214, keeping the same file name, and thus requires no changes to the Web Server's 106 configuration file 202. This new DLL 214 must completely emulate the function of the original DLL with the addition of two software stopwatches that measure when the DLL was entered and where it exits on the non-symmetric paths. Thus, for the replacement measuring technique, the stopwatches are located at two different points in the new DLL 214. The difference is the "Application Response Time" metric. This approach can be used for any processor installed on the Web Server 106 and is not limited to replacement of the CGI Processor.

Altering the Web Page Dynamically

Web Agent 114 takes the Web Page 212 that resulted in the execution of Web Application 204 via CGI Back-End processor or by local processing at Web Server 106 and modifies it. Web Agent 114 modifies the Web Page's 212 content by inserting an additional HTML language tag, in the proper location, defining a Java Applet 216 to now be part of Web Page 212, as defined in the HTML programmers guide, which is herein incorporated by reference. This technique dynamically tags the Web Page 212 with an additional program reference called an Applet, which triggers the measurement of the Web Page 212 when it is sent to the Web Browser 104. This modified Web Page 212 is sent to Web Browser 104 via network path 218. In the process of tagging Web Page 212 with a Java Applet 216, the "Application Response Time" measurement computed by the Web Agent 114, as the time between network path 208 and 210, is placed as a parameter to the Java Applet 200. In addition, any number of other parameters can be added to the Java Applet 212 for other purposes.

At the Web Browser 104, the Java Applet program 216 is requested via reference made by the Java Applet tag that was dynamically added to Web Page 212 via Web Agent 114. It is retrieved via a request over network path 220 and transferred to the Web Browser 104 via Network path 222 from JAR File 224 residing in a shared directory on Web Server 106. At this point, as standard for all commercial Web Browsers 104, the Java Applet 216 is executed within and under the control the Web Browser 104. Once started, the Java Applet 216 listens for Web Browser 104 software events that will signal it to begin setting and terminating software stopwatches for the purpose of measuring Web Browser 104 "Round Trip Response Time". In addition, JAVA Applet 216 will be responsible for three additional response time segments, sub-functions of "Round Trip Response Time", known as "Load Time", "Resolve Time" and "Browse Time."

Calculating Load Time

The first Web Browser 104 event that signals the Java Applet 216 to begin a software stopwatch occurs when interaction with the Web Browser 104 via a Mouse-Click, <ENTER> key depression, or other computer keyboard takes place. This event signals the start of a software stopwatch by the Java Applet 216, which will mark the beginning of the "Round Trip Response Time" measurement. This request for Web Server 106 information travels to the Web Server 106 via network path 206 and optionally routed to the Application Server 204 via network path 208 where once again Web Agent 114 performs "Application Response Time" measurements. The results of Application Server 204 are returned to Web Server 106 via Network path 210 where Web Agent 114 completes the "Application Response Time Measurement." The resulting Web Page 212 is modified by the addition of the Java Applet 216 measurement tag and sent back to Web Browser 104 via network path 218 whether the request was serviced by Application Server 204 or locally at Web Server 106. Once at the Web Browser 104, termination of the software stopwatch takes place. The stopwatch timing now reflects the measurement called "Load Time." Some Web Browsers 104 do not provide software events to capture the Load Time measurement completely. Specifically, some Web Browsers 104 do not capture the start of a Mouse-Click or other computer keyboard activity. For this reason, the present invention provides a technique that can be used to closely approximate a Round Trip Load Time. The present invention uses the Web Page Unload events, which occur as part of Web Browser 104 operation of unloading the previous web page 212 just viewed in favor of the new web page 212 coming in. This occurs when the first part of Web Page 212 is being delivered to the Web Browser 104 due to an interaction with Web Browser 104. This occurs after network events 206 and 218 have completed. Since "Application Response Time" is imbedded in Web Page 212 as a parameter of Java Applet 216, the "Application Response Time" can be statistically substituted as the Web Page 212 "Load Time."

This substitution is accurate when CGIs and other Back-End Processors take more real-time to process the transaction than the time needed to transfer the resulting Web Page 212 over network paths 206 and 218. In this case any network delay not measured over network paths 206 and 218 are small percentages of the Round Trip Load Time, and thus do not significantly affect the measurement.

The substitution is also accurate when the absence of any Back-End Processors tend to make "Application Response Time" small, and the overall Round Trip Load Time comprises mostly of transit time along network paths 206 and 218 for resulting Web Page 212. This scenario is rare, and, as such, a small "Application Response Time" plus a small amount from network paths 206 and 218 equal a small measurement value. In this scenario, the result is small whether network paths 206 and 218 are in the measurement or not. For the purpose of measurements where the Internet 100 is concerned, these small valued results can be inaccurate by as much as a couple of seconds. However, true accuracy of small, i.e., several seconds, Internet 100 response time is of little meaning because Internet 100 response time is rarely if ever that small.

However, for very degraded networks, e.g, where network path 206 and 218 are degraded, even when dealing with a small resulting Web Page 212, if "Application Response Time" is small, this statistically substituted technique can be off more than a few seconds.

"Load Time" measures either the amount of time it takes to retrieve Web Page 212 from the Application Server 204, or the time it takes to locally service the Web Page 212 at the Web Server 106. Thus, "Load Time" incorporates "Application Server Response Time" as a component of its time. Yet, Web Agent 114 computes "Application Server Response Time" independently as well.

Calculating Resolve Time

Once Web Page 212 is sent to the Web Browser 104 and "Load Time" is calculated, the Java Applet 216 begins a new software stopwatch to measure "Resolve Time." Web Browser 104 begins the task of resolving the Web Page 212, which is a task common to all Web Browsers 104 by parsing through its Web Page 212 text looking for graphics and other imbedded HTML object tags. These imbedded HTML tags have a specific format and are easily located by the Web Browser 104. For the first imbedded HTML object tag, Web Browser starts the software stopwatch, and makes a request to Web Server 106. For each imbedded HTML object tag, Web Browser 104 makes a separate request to Web Server 106 via network path 220 for the HTML object tag, and Web Server 106 returns results to the Web Browser 104 via network path 222. Web Browser 104 continues to make Web Server 106 requests until all imbedded HTML object tags from Web Page 212 have been identified and retrieved via network path 220 and 222. After the final web HTML object tag is located and retrieved, Java Applet 216 terminates its software stopwatch and computes the difference of all these retrievals as the "Resolve Time" measurement. Resolve Time measures the amount of time it takes to retrieve all the graphics and other web imbedded objects from Web Server 106 defined as part of Web Page 212. Resolve Time measurements exclude "Load Time" and "Application Response Time".

Calculating Browse Time

At this point, measurements of the "Round Trip Response Time", the "Load Time," and the "Resolve Time" have been calculated by Java Applet 216 for the specific Web Browser 104 request. "Round Trip Response Time" will equal "Load Time" plus "Resolve Time." "Application Response Time" is calculated separately by Web Agent 114. Once "Resolve Time" has been computed, Java Applet 216 begins another software stopwatch, which measures the amount of time Web Page 212 is being displayed and viewable in the Web Browser 104. Once someone does an interaction such as a Mouse-Click, <ENTER> key depression, or computer keyboard action at the Web Browser 104, Java Applet 216 terminates the software stopwatch producing as its difference, the metric known at "Browse Time."

Sending Results Back to Web Server

At the next Mouse-Click, <ENTER>, or other computer keyboard operation, Java Applet 216 places all the measurements about the specific Web Browser 104 transaction into a memory buffer and sends a copy of this data to Web Agent 114 via network path 226. Once at Web Agent 114 it is then formatted and copied into Response Time Log 228. In addition, Web Agent 114 buffers and copies its independent measurements of "Application Response Time" into a separate Response Time Log 230. Response Time Logs 228 and 230 now contain records fully describing response time information for this particular Web Browser 104, to Web Server 106, to Web Application 204 transaction. The process can then be repeated for other transactions as desired.

Once each component, e.g., Load Time, Resolve Time, Application Response Time and Browse Time are known, system users and network administrators can use the measurements to optimize the system response time by determining the places in the system that are providing slow response times and, where possible, implementing solutions to decrease the response time, e.g., adding system resources, removing interfering applications, etc.

Logic

Figure 3:
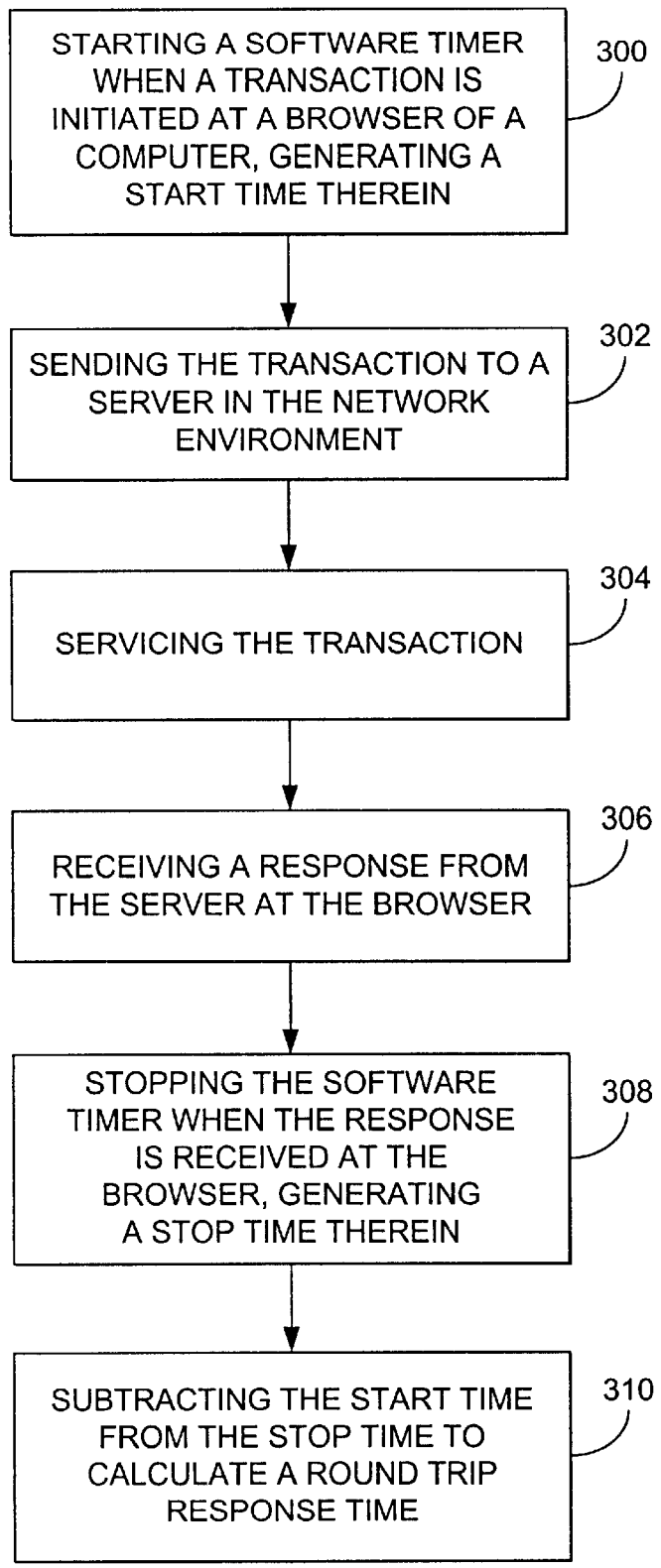
FIG. 3 is a flow chart illustrating the steps used in the present invention.

FIG. 3 is a flow chart illustrating the steps used in the present invention.

Block 300 represents the computer performing the step of starting a software timer when a transaction is initiated at a browser of the computer, generating a start time therein.

Block 302 represents the computer performing the step of sending the transaction to a server in the network environment.

Block 304 represents the computer performing the step of servicing the transaction.

Block 306 represents the computer performing the step of receiving a response from the server at the browser.

Block 308 represents the computer performing the step of stopping the software timer when the response is received at the browser, generating a stop time therein.

Block 310 represents the computer performing the step of subtracting the start time from the stop time to calculate a round trip response time.

Conclusion

In summary, the present invention provides a method, apparatus, and article of manufacture for measuring a round trip response time for a transaction performed by a computer in a network environment. The method comprises the steps of starting a software timer when a transaction is initiated at a browser of the computer, and sending the transaction to a server in the network environment. The server services the transaction, and generates a response to the transaction. When the response is received at the browser the software timer is stopped. The start time is subtracted from the stop time to calculate a round trip response time.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for measuring a round trip response time for a transaction performed by a computer in a network environment, comprising the steps of:

(a) starting a first software timer when a transaction is initiated at a browser of the computer, generating a first start time therein;

(b) sending the transaction to a server in the network environment;

(c) servicing the transaction, wherein the servicing comprises:

(i) starting a second software timer at the server when the transaction is received at the server, generating a second start time therein;

(ii) routing the transaction from the server to an application server;

(iii) processing the transaction at the application server;

(iv) returning a result of the transaction to the server;

(v) stopping the second software timer when the results of the transaction are received at the server, generating a second stop time therein; and (vi) subtracting the second start time from the second stop tune to determine an application response time of the application server;

(d) receiving a response from the server at the browser;

(e) stopping the first software timer when the response is received at the browser, generating a first stop time therein; and (f) subtracting the first start time from the first stop time to calculate a round trip response time.

2. The method of claim 1, wherein a position for routing and a position for returning are different positions within the browser.

3. The method of claim 1, wherein the response is a web page.

4. The method of claim 1, wherein the first software timer is implemented in a first dynamic link library (DLL) that replaces an original second dynamic link library (DLL) of an application processor.

5. The method of claim 1, wherein the round trip response time is divided into at least two segments.

6. The method of claim 1, wherein the round trip response time comprises a load time, a resolve time, and a browse time.

7. The method of claim 6, wherein the load time is calculated by performing the steps of:

modifying the results of the transaction by adding a measurement tag to the results of the transaction;

stopping the first software timer when the measurement tag is received at the browser, generating the first stop time therein; and subtracting the first start time from the first stop time to generate the load time.

8. The method of claim 7, wherein the load time is approximated by the application response time.

9. The method of claim 6, wherein the resolve time is calculated by performing the steps of:

receiving a beginning of the response at the browser from the server;

parsing through the response for a first imbedded HTML object tag starting a third software timer when the first imbedded HTML object tag is parsed by the browser, generating a third time therein;

parsing the response for additional imbedded HTML object tags;

for each imbedded HTML object tag parsed, requesting an HTML object associated with the imbedded HTML object tag from the server;

returning each HTML object to the browser;

stopping the third software timer when a final HTML object is received at the browser, generating a third stop time therein; and subtracting the third start time from the third stop time to generate the resolve time.

10. The method of claim 9, wherein the browse time is calculated by performing the steps of:

starting a fourth software timer, generating a fourth start time therein after the step of subtracting the third start time from the third stop time, starting a fourth software timer performing a second transaction;

stopping the fourth software timer, generating a fourth stop time therein; and subtracting the fourth start time from the fourth stop time to generate the browse time.

11. A computerized apparatus for measuring a round trip response time for a transaction performed by a computer in a network environment, comprising;

(a) a computer having a memory and a browser, coupled to a network;

(b) a server coupled to the network; and (c) a first software timer, stored in the memory of the computer, wherein the first software timer is started when a transaction is initiated at the browser and sent to the server via the network, the first software timer is stopped when a response to the transaction is received at the browser from the server via the network, the first software timer calculates the round trip response time by subtracting the start time from the stop time; and wherein the roundtrip response time is calculated using an application response time, wherein the application response time is calculated by:

(i) starting a second software timer at the server when the transaction is received at the server, generating a second start time therein;

(ii) routing the transaction from the server to an application server;

(iii) processing the transaction at the application server;

(iv) returning a result of the transaction to the server;

(v) stopping the second software timer when the results of the transaction are received at the server, generating a second stop time therein; and (vi) subtracting the second start time from the second stop time to determine an application response time of the application server.

12. An article of manufacture comprising a program storage medium readable by a computer having a memory, the medium tangibly embodying one or more programs of instructions executable by the computer to perform method steps for measuring a round trip response time for a transaction performed by the computer in a network environment, the method comprising the steps of:

(a) starting a first software timer when a transaction is initiated at a browser of the computer, generating a first start time therein;

(b) sending the transaction to a server in the network environment;

(c) servicing the transaction, wherein the servicing comprises:

(i) starting a second software timer at the server when the transaction is received at the server, generating a second start time therein;

(i) routing the transaction from the server to an application server;

(iii) processing the transaction at the application server;

(iv) returning a result of the transaction to the server;

(v) stopping the second software timer when the results of the transaction are received at the server, generating a second stop time therein; and (vi) subtracting the second start time from the second stop time to determine an application response time of the application server;

(d) receiving a response from the server at the browser;

(e) stopping the first software timer when the response is received at the browser, generating a first stop time therein; and subtracting the first start time from the first stop time to calculate a round trip response time.

13. The apparatus of claim 11 wherein the response is a web page.

14. The apparatus of claim 11 wherein the first software time is implemented in a first dynamic link library (DLL) that replaces an original second dynamic link library (DLL) of an application processor.

15. The apparatus of claim 11 wherein the round trip response time further comprises a load time that is calculated by the first timer, wherein the load time is calculated by:

modifying the results of the transaction by adding a measurement tag to the results of the transaction;

stopping the first software timer when the measurement tag is received at the browser, generating the first stop time therein; and subtracting the first start time from the first stop time to generate the load time.

16. The apparatus of claim 11 wherein the round trip response time further comprises a load time, wherein the load time is approximated by the application response time.

17. The apparatus of claim 11 wherein the round trip response time further comprises a resolve time calculated by the first timer, wherein the resolve time is calculated by:

receiving a beginning of the response at the browser from the server;

parsing through the response for a first imbedded HTML object tag;

starting a third software timer when the first imbedded HTML object tag is parsed by the browser, generate a third time therein;

parsing the response for additional imbedded HTML object tags;

for each imbedded HTML object tag parsed, requesting an HTML object associated with the imbedded HTML object tag from the server;

returning each HTML object to the browser;

stopping the third software timer when a final HTML object is received at the browser, generating a third stop time therein; and subtracting the third start time from the third stop time to generate the resolve time.

18. The apparatus of claim 17 wherein the round trip response time further comprises a browse time calculated by the first timer, wherein the browse time is calculated by:

starting a fourth software timer, generating a fourth start time therein after subtracting the third start time from the third stop time, starting a fourth software timer; performing a second transaction;

stopping the fourth software timer, generating a fourth stop time therein; and subtracting the fourth start time from the fourth stop time to generate the browse time.

19. The article of manufacture of claim 12 wherein the response is a web page.

20. The article of manufacture of claim 14 wherein the first software timer is implemented in a first dynamic link library (DLL) that replaces an original second dynamic link library (DLL) of an application processor.

21. The article of manufacture of claim 12 wherein the round trip response time further comprises a load time, wherein the method further comprises calculating the load time by:

modifying the results of the transaction by adding a measurement tag to the results of the transaction;

stopping the first software timer when the measurement tag is received at the browser, generating the first stop time therein; and subtracting the first start time from the first stop time to generate the load time.

22. The article of manufacture of claim 12 wherein the round trip response time further comprises a load time, wherein the method further comprises approximating the load by the application response time.

23. The article of manufacture of claim 12 wherein the round trip response time further comprises a resolve time, wherein the method further comprises calculating the resolve time by:

receiving a beginning of the response at the browser from the server;

parsing through the response for a first imbedded HTML object tag;

starting a third software timer when the first imbedded HTML object tag is parsed by the browser, generating a third time therein;

parsing the response for additional imbedded HTML object tags;

for each imbedded HTML object tag parsed, requesting an HTML object associated with the imbedded HTML object tag from the server;

returning each HTML object to the browser;

stopping the third software timer when a final HTML object is received at the browser, generating a third stop time therein; and subtracting the third start time from the third stop time to generate the resolve time.

24. The article of manufacture of claim 23 wherein the round trip response time further comprises a browse time, wherein the method further comprises calculating the browse by:

starting a fourth software timer, generating a fourth start time therein after subtracting the third start time from the third stop time, starting a fourth software timer;

performing a second transaction;

stopping the fourth software timer, generating a fourth stop time therein; and subtracting the fourth start time from the fourth stop time to generate the browse time.

* * * * *

UNITED STATES PATENT AND TRADEMARK OFFICE
CERTIFICATE OF CORRECTION

PATENT NO. : 6,526,371 B1
DATED : February 25, 2003
INVENTOR(S) : Paul F. Klein and Linh Ba Chung It is certified that error appears in the above-identified patent and that said Letters Patent is hereby corrected as shown below:

Column 9,
Line 29, "tune" should read -- time --.

Column 10,
Line 2, after "tag" insert a semicolon -- ; --
Line 30, ";" should read a colon -- ;- --

Column 11,
Line 22, before "subtracting" insert -- (f) --

Column 12,
Line 11, "14" should read -- 12 --
Line 60, strike the semicolon ";"

Signed and Sealed this

Nineteenth Day of August, 2003

JAMES E. ROGAN
*Director of the United States Patent and Trademark Office*